US009941745B2

(12) United States Patent
Akuzawa et al.

(10) Patent No.: US 9,941,745 B2
(45) Date of Patent: Apr. 10, 2018

(54) RESONANT TYPE POWER TRANSMISSION SYSTEM AND RESONANCE TYPE POWER TRANSMISSION DEVICE (71) Applicant: Mitsubishi Electric Engineering Company, Limited, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Yuki Ito, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 44 days.

(21) Appl. No.: 15/039,249

(22) PCT Filed: Dec. 26, 2013

(86) PCT No.: PCT/JP2013/084839
§ 371 (c)(1),
(2) Date: May 25, 2016

(87) PCT Pub. No.: WO2015/097810
PCT Pub. Date: Jul. 2, 2015

(65) Prior Publication Data
US 2017/0163093 A1 Jun. 8, 2017

(51) Int. Cl.
*H02J 17/00* (2006.01)
*H02J 50/12* (2016.01)
(Continued)

(52) U.S. Cl.
CPC .............. *H02J 50/12* (2016.02); *H02J 50/40* (2016.02); *H02J 50/60* (2016.02)

(58) Field of Classification Search
CPC ............. H02J 50/12; H02J 50/40; H02J 50/60
(Continued)

(56) References Cited

U.S. PATENT DOCUMENTS

2009/0133942 A1   5/2009  Iisaka et al.
2010/0264746 A1* 10/2010  Kazama .................. H02J 7/025
                                                  307/104
(Continued)

FOREIGN PATENT DOCUMENTS

JP    2009-131039 A    6/2009
JP     2011-72074 A    4/2011
(Continued)

OTHER PUBLICATIONS

Office Action dated Feb. 28, 2017 in Japanese Patent Application No. 2015-554399 (with English language translation).
(Continued)

*Primary Examiner* — John Poos
(74) *Attorney, Agent, or Firm* — Oblon, McClelland, Maier & Neustadt, L.L.P.

(57) ABSTRACT

A second resonant type transmission power supply device 1*b* includes a transmission power state detecting circuit 11*b* that detects a transmission power state of a second transmission antenna 2*b*, a foreign object detecting circuit 124*b* that detects the presence or absence of a foreign object in an overlapping range of electromagnetic fields on the basis of a detection result acquired by the transmission power state detecting circuit 11*b*, and a power control circuit 125*b* that, when a foreign object is detected by the foreign object detecting circuit 124*b*, controls a first resonant type transmission power supply device 1*a* in such a way as to reduce or stop the supply of electric power to a first transmission antenna 2*a*.

16 Claims, 5 Drawing Sheets (51) Int. Cl.
*H02J 50/60* (2016.01)
*H02J 50/40* (2016.01)

(58) Field of Classification Search
USPC .................................. 307/104, 105, 106, 107
See application file for complete search history.

(56) References Cited

U.S. PATENT DOCUMENTS

| | | |
|---|---|---|
| 2012/0146580 A1 | 6/2012 | Kitamura et al. |
| 2012/0326524 A1 | 12/2012 | Matsumoto et al. |
| 2013/0162220 A1* | 6/2013 | Iijima .................. H02J 7/0052 320/137 |
| 2014/0253029 A1 | 9/2014 | Uchida et al. |

FOREIGN PATENT DOCUMENTS

| | | |
|---|---|---|
| JP | 2011-229265 A | 11/2011 |
| JP | 2013-215073 A | 10/2013 |
| WO | WO 2013/080285 A1 | 6/2013 |

OTHER PUBLICATIONS

International Search Report dated Feb. 4, 2014, in PCT/JP2013/084839 filed Dec. 26, 2013.

\* cited by examiner

RESONANT TYPE POWER TRANSMISSION SYSTEM AND RESONANCE TYPE POWER TRANSMISSION DEVICE

FIELD OF THE INVENTION

The present invention relates to a resonant type power transmission system and a resonant type power transmission device that detect the presence or absence of a foreign object in an electromagnetic field generated from a transmission antenna, and, when detecting a foreign object, reduce or stop power transmission.

BACKGROUND OF THE INVENTION

Figure 5:
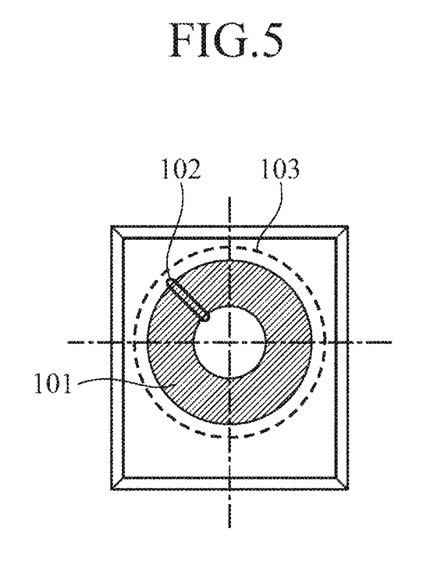
FIG. 5 is a diagram showing the configuration of a conventional power supply device.

A conventional power supply device having a function of detecting the presence or absence of a foreign object, as shown in FIG. 5, is known (for example, refer to patent reference 1). In the power supply device disclosed by this patent reference 1, a plurality of sensor coils 102 in each of which its winding axis is orthogonal to a transmission antenna 101 are disposed (only one sensor coil is shown in FIG. 5) so as to detect a foreign object existing in surroundings 103 of the sensor coils 102. A reception antenna (not shown) is configured in the same way.

RELATED ART DOCUMENT

Patent Reference

Patent reference 1: Japanese Unexamined Patent Application Publication No. 2013-215073

SUMMARY OF THE INVENTION

Problems to be Solved by the Invention

However, because the sensor coils 102 for foreign object detection are disposed separately from the transmission antenna 101 and the reception antenna in the conventional configuration, the following problems arise. A first problem is that the size of the entire device increases by the size of the sensor coils 102. More specifically, because the sensor coils 102 are arranged on the transmission antenna 101 and the reception antenna, the height (thickness) of the device increases especially and its mass also increases. Another problem is that it is difficult to detect a foreign object existing at a long distance away from the transmission antenna 101 and the reception antenna or in the vicinity of the center between the transmission antenna 101 and the reception antenna even if the foreign object exists within the range of the electromagnetic field generated from the transmission antenna 101. A further problem is that because a large number of sensor coils 102 are needed for foreign matter detection, this results in a cause of increase in the cost. A still further problem is that because it is necessary to drive a large number of sensor coils 102 for foreign matter detection, this results in a cause of increase in the power consumption.

The present invention is made in order to solve the above-mentioned problems, and it is therefore an object of the present invention to provide a resonant type power transmission system and a resonant type power transmission device capable of detecting the presence or absence of a foreign object in an electromagnetic field generated from a transmission antenna, and performing reduction or stop of power transmission when detecting a foreign object.

Means for Solving the Problem

According to the present invention, there is provided a resonant type power transmission system including: a transmission and reception system for power transmission having a first transmission antenna, a first reception antenna, and a first resonant type transmission power supply device to control the supply of electric power to the first transmission antenna; a transmission and reception system for foreign object detection having a second transmission antenna whose range of an electromagnetic field generated therefrom overlaps that of an electromagnetic field generated from the first transmission antenna, a second reception antenna, and a second resonant type transmission power supply device to supply regular or intermittent small power to the second transmission antenna; a starting circuit to receive the small power from the second reception antenna and start; and a reception power supply device to be started by the starting circuit and receive the electric power from the first reception antenna, in which the second resonant type transmission power supply device includes: a transmission power state detecting circuit to detect a transmission power state of the second transmission antenna; a foreign object detecting circuit to detect the presence or absence of a foreign object in the overlapping range of the electromagnetic fields on the basis of a detection result acquired by the transmission power state detecting circuit; and a power control circuit to control the first resonant type transmission power supply device in such a way as to reduce or stop the supply of the electric power to the first transmission antenna when a foreign object is detected by the foreign object detecting circuit.

Advantages of the Invention

Because the resonant type power transmission system according to the present invention is configured as above, the presence or absence of a foreign object in the electromagnetic field generated from the transmission antenna (first transmission antenna) can be detected, and, when a foreign object is detected, the power transmission can be reduced or stopped.

BRIEF DESCRIPTION OF THE FIGURES

FIG. 2(a) is a diagram showing the amplitude of a voltage (shown by a broken line) in a transmission and reception system for foreign object detection and the amplitude of a voltage (shown by a solid line) in a transmission and reception system for power transmission in a case in which no foreign object exists, and FIG. 2(b) is a diagram showing the amplitude of the voltage (shown by a broken line) in the transmission and reception system for foreign object detection and the amplitude of the voltage (shown by a solid line) after power control in the transmission and reception system for power transmission in a case in which a foreign object exists;

FIG. 4(a) is a diagram showing a control signal for a first resonant type transmission power supply device, FIG. 4(b) is a diagram showing a load current by a reception power supply device, and FIG. 4(c) is a diagram showing the amplitude of a current in a transmission and reception system for foreign object detection.

EMBODIMENTS OF THE INVENTION

Hereafter, the preferred embodiments of the present invention will be explained in detail with reference to the drawings.

Embodiment 1

Figure 1:
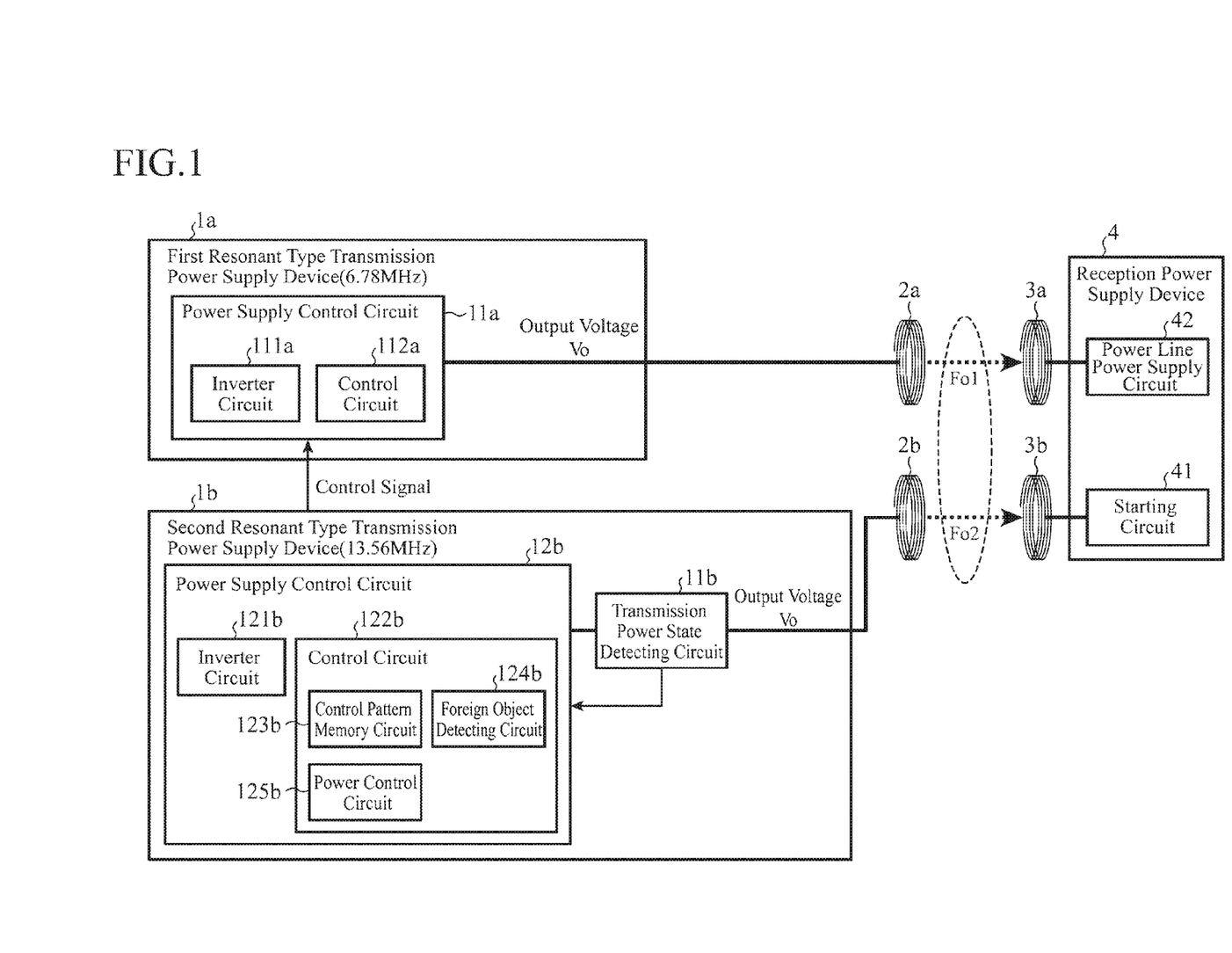
FIG. 1 is a diagram showing example of the configuration of a resonant type power transmission system according to Embodiment 1 of the present invention.

FIG. 1 is a diagram showing the configuration of a resonant type power transmission system according to Embodiment 1 of the present invention.

The resonant type power transmission system transmits electric power including an electric signal. This resonant type power transmission system is configured with first and second resonant type transmission power supply devices 1a and 1b, first and second transmission antennas 2a and 2b, first and second reception antennas 3a and 3b, and a reception power supply device 4, as shown in FIG. 1. The first resonant type transmission power supply device 1a, the first transmission antenna 2a and the first reception antenna 3a are a transmission and reception system for power transmission that performs transmission of main power. Further, the second resonant type transmission power supply device 1b, the second transmission antenna 2b and the second reception antenna 3b are a transmission and reception system for foreign object detection that performs foreign object detection. Further, the first and second resonant type transmission power supply devices 1a and 1b and the first and second transmission antennas 2a and 2b construct a resonance type power transmission device, and the first and second reception antennas 3a and 3b and the reception power supply device 4 construct a resonance type power reception device.

Although the case in which the transmission and reception systems perform power transmission by using different fixed frequencies as their transmission frequencies is shown in the example of FIG. 1, this embodiment is not limited to this example, and the transmission and reception systems can alternatively use an identical fixed frequency.

The first resonant type transmission power supply device 1a is arranged as a stage preceding the first transmission antenna 2a, and controls the supply of electric power to the first transmission antenna 2a. This first resonant type transmission power supply device 1a is configured with a power supply control circuit 11a.

The power supply control circuit 11a is configured with an inverter circuit 111a that performs output of a high frequency alternating current, and a control circuit 112a that controls the output. The inverter circuit 111a is an inverter power supply circuit of AC input-AC output type or DC input-AC output type.

The first transmission antenna 2a transmits the electric power from the first resonant type transmission power supply device 1a to the first reception antenna 3a (the transmission is not limited to non-contact one).

The first reception antenna 3a receives the electric power from the first transmission antenna 2a (the reception is not limited to non-contact one). The electric power received by this first reception antenna 3a is supplied to load equipment or the like (not shown) via the reception power supply device 4.

The second resonant type transmission power supply device 1b is arranged as a stage preceding the second transmission antenna 2b, and controls the supply of electric power to the second transmission antenna 2b. This second resonant type transmission power supply device 1b regularly or intermittently supplies, as the electric power to the second transmission antenna 2b, small power equal to or smaller than that according to the human radiation protection guidelines and standards and having a degree that can start a starting circuit 41 of the reception power supply device 4, which will be described below. Further, the second resonant type transmission power supply device 1b has a function of detecting the presence or absence of a foreign object in an electromagnetic field shown by a broken line in FIG. 1 and generated from the first transmission antenna 2a (space including power transmission space between the first transmission and reception antennas 2a and 3a, and its neighborhood), and a function of controlling the first resonant type transmission power supply device 1a in such a way as to reduce or stop the supply of the electric power to the first transmission antenna 2a when detecting a foreign object. The foreign object includes a dielectric foreign object (a person's hand, an animal or the like) and a magnetic foreign object (metal or the like). The details of this second resonant type transmission power supply device 1b will be described below.

The second transmission antenna 2b transmits the electric power from the second resonant type transmission power supply device 1b to the second reception antenna 3b (the transmission is not limited to non-contact one). This second transmission antenna 2b is arranged at a position where an electromagnetic field generates therefrom overlaps the range of the electromagnetic field generated from the first transmission antenna 2a. More specifically, in the transmission and reception system for power transmission, when the transmission power is large, the electromagnetic wave leaks over a wide range and its level exceeds that according to the human radiation protection guidelines and standards. Therefore, the transmission and reception system for foreign object detection is arranged in such a way as to be able to detect a foreign object existing in the above-mentioned range and to be controlled to a safe state (perform reduction or stop of the power transmission).

The second reception antenna 3b receives the electric power from the second transmission antenna 2b (the reception is not limited to non-contact one).

The reception power supply device 4 is arranged between the first and second reception antennas 3a and 3b, and load equipment or the like, starts with the electric power from the second reception antenna 3b, and rectifies the electric power (ac output) from the first reception antenna 3a. This reception power supply device 4 is a power supply circuit of AC input-DC output type or AC input-AC output type. The details of this reception power supply device 4 will be described below.

A transmission method which the resonant type power transmission system uses in the case of wireless power transmission is not limited particularly, and can be any one of a method according to magnetic-field resonance, a method according to electric-field resonance, and a method according to electromagnetic induction.

Next, the configuration of the second resonant type transmission power supply device 1b will be explained.

The second resonant type transmission power supply device 1b is configured with a transmission power state detecting circuit 11b and a power supply control circuit 12b.

The transmission power state detecting circuit 11b detects the transmission power state of the second transmission antenna 2b. This transmission power state detecting circuit 11b detects, as the transmission power state, the electric power (reflection power) that returns to the second transmission antenna 2b without being able to be power-transmitted from the second transmission antenna, a phase difference between a voltage and a current which are inputted to the second transmission antenna 2b, and the amplitudes of the voltage and the current.

The power supply control circuit 12b detects the presence or absence of a foreign object in the overlapping range of the electromagnetic fields from the first and second transmission antennas 2a and 2b on the basis of the detection result acquired by the transmission power state detecting circuit 11b, and controls the first resonant type transmission power supply device 1a in such a way as to reduce or stop the supply of the electric power to the first transmission antenna 2a when detecting a foreign object. This power supply control circuit 12b is configured with an inverter circuit 121b that performs output of a high frequency alternating current, and a control circuit 122b that controls the output. The inverter circuit 121b is an inverter power supply circuit of AC input-AC output type or DC input-AC output type. The control circuit 122b is configured with a control pattern memory circuit 123b, a foreign object detecting circuit 124b and a power control circuit 125b.

The control pattern memory circuit 123b is a memory that stores information about the foreign object detection and the power control. The information stored in this control pattern memory circuit 123b includes information showing a threshold for the transmission power state (the reflection power, the phase difference between the voltage and the current, and the amplitudes of the voltage and the current), which is used when the foreign object detecting circuit 124b performs the foreign object detection, information showing the types of foreign objects (dielectric objects and magnetic objects) detectable using the transmission power state, and information showing the descriptions of the control on the first resonant type transmission power supply device 1a according to the types of foreign objects (stop of the electric power supply in the case of a dielectric foreign object, reduction of the electric power supply in the case of a magnetic foreign object, etc.)

The foreign object detecting circuit 124b detects the presence or absence of a foreign object in the overlapping range of the electromagnetic fields from the first and second transmission antennas 2a and 2b according to the information stored in the control pattern memory circuit 123b and on the basis of the detection result acquired by the transmission power state detecting circuit 11b.

When a foreign object is detected by the foreign object detecting circuit 124b, the power control circuit 125b controls the first resonant type transmission power supply device 1a according to the information stored in the control pattern memory circuit 123b in such a way as to reduce or stop the supply of the electric power to the first transmission antenna 2a. At that time, the power control circuit 125b generates a control signal for reducing or stopping the supply of the electric power to the first transmission antenna 2a, and outputs the control signal to the first resonant type transmission power supply device 1a.

Next, the configuration of the reception power supply device 4 will be explained.

The reception power supply device 4 is configured with the starting circuit 41 and a power line power supply circuit 42.

The starting circuit 41 receives the small power from the second reception antenna 3b and then starts, and starts the power line power supply circuit 42.

The power line power supply circuit 42 is started by the starting circuit 41, and receives the electric power from the first reception antenna 3a.

Further, the case in which only one transmission and reception system for foreign object detection is illustrated is shown in FIG. 1. However, this embodiment is not limited to this example, and a plurality of small-size transmission and reception systems for foreign object detection (second transmission and reception antennas 2b and 3b are formed into an elliptic shape, a round shape or the like) can be arranged around the transmission and reception system for power transmission. Further, this embodiment is not limited to the configuration, as shown in FIG. 1, of a type in which transmission and reception units are disposed opposite to each other, in which the transmission and reception antennas 2a and 3a are disposed opposite to each other, and a configuration of a type in which transmission and reception units are engaged with each other, in which the transmission and reception antennas 2a and 3a are engaged with each other, can be alternatively used. In the case of this type in which transmission and reception units are engaged with each other, the first transmission antenna 2a can be arranged inwardly and the second transmission antenna 2b can be arranged outwardly, or the first and second transmission antennas can be arranged in the reverse way.

Figure 2:
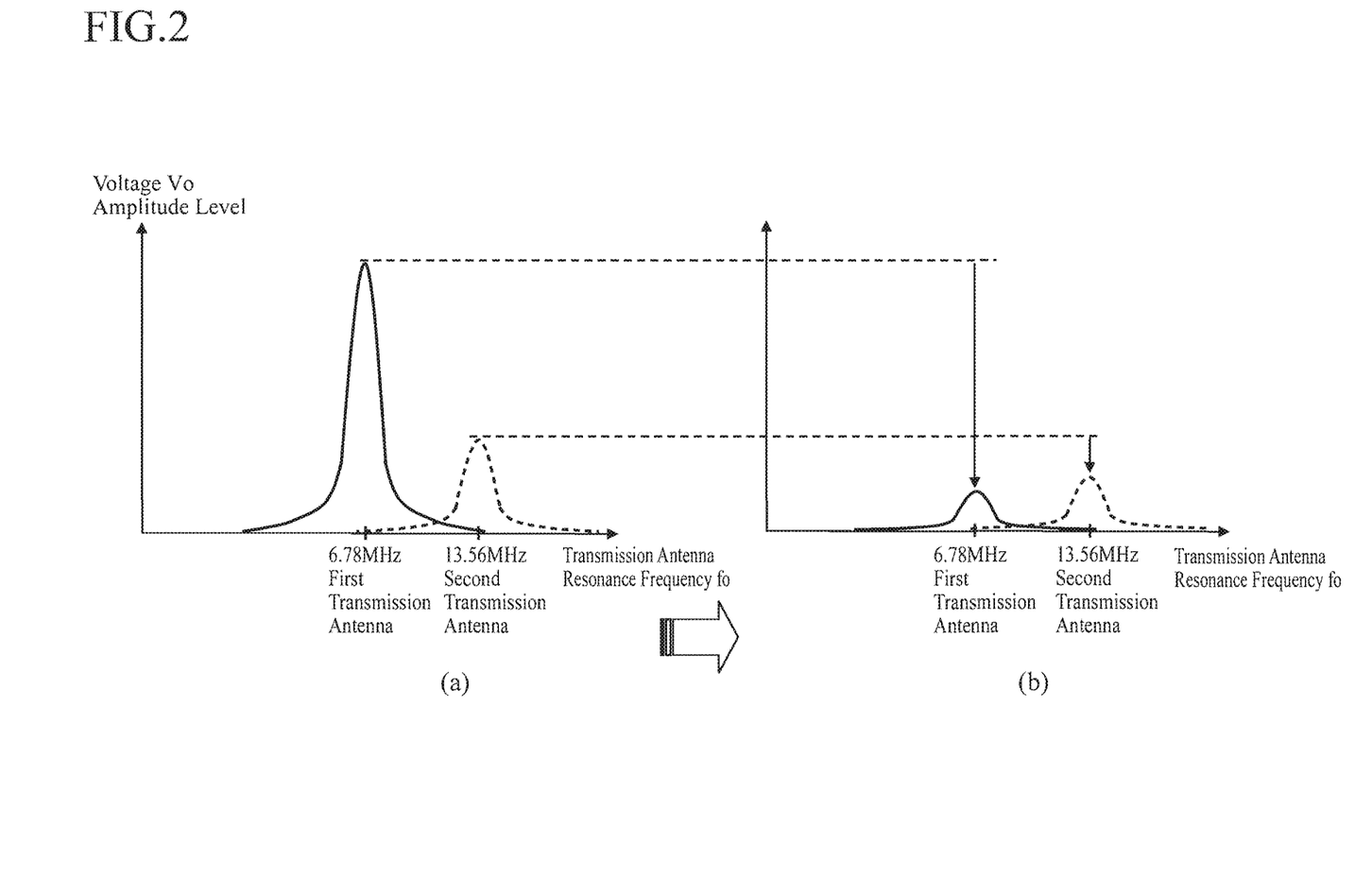
FIG. 2 is a diagram explaining the operation of the resonant type power transmission system according to Embodiment 1 of the present invention.

Next, the operation of the resonant type power transmission system configured as above will be explained by referring to FIG. 2. In FIG. 2, a solid line shows the amplitude of a voltage inputted to the first transmission antenna 2a of the transmission and reception system for power transmission, and a broken line shows the amplitude of the voltage inputted to the second transmission antenna 2b of the transmission and reception system for foreign object detection.

In the resonant type power transmission system, first, the transmission and reception system for foreign object detection performs power transmission with small power equal to or smaller than that according to the human radiation protection guidelines and standards and having a degree that can start the starting circuit 41. More specifically, AC or DC power (small power) is supplied to the power supply control circuit 12b of the second resonant type transmission power supply device 1b, and the inverter circuit 121b of the power supply control circuit 12b supplies an AC output having a high frequency to the second transmission antenna 2b. The electric power supplied to the second transmission antenna 2b resonates at the AC frequency and is transmitted from the second transmission antenna 2b to the second reception antenna 3b. AC output of the electric power received by the second reception antenna 3b to the reception power supply device 4 is performed, and the starting circuit 41 starts.

After that, the power line power supply circuit 42 starts, and the transmission and reception system for power transmission starts the transmission of main power. More specifically, AC or DC power (main power) is supplied to the power supply control circuit 11a of the first resonant type transmission power supply device 1a, and the inverter circuit 111a of the power supply control circuit 11a supplies an AC output having a high frequency to the first transmission antenna 2a. The electric power supplied to the first transmission antenna 2a resonates at the AC frequency and is transmitted from the first transmission antenna 2a to the first reception antenna 3a. AC output of the electric power received by the first reception antenna 3a to the reception power supply device 4 is performed. The reception power supply device 4 then rectifies the electric power and performs DC or AC output of the electric power.

On the other hand, the transmission and reception system for foreign object detection performs the power transmission of the small power regularly or intermittently. On the other hand, in the second resonant type transmission power supply device 1b, the transmission power state detecting circuit 11b detects the transmission power state of the second transmission antenna 2b and transmits a signal showing the state to the power supply control circuit 12b. The control circuit 122b of the power supply control circuit 12b then detects the presence or absence of a foreign object in the overlapping range of the electromagnetic fields from the first and second transmission antennas 2a and 2b, thereby controlling the first resonant type transmission power supply device 1a in such a way as to control the ac output to the first transmission antenna 2a.

When no foreign object exists in the overlapping range of the electromagnetic fields from the first and second transmission antennas 2a and 2b, the amplitude of the voltage inputted to the second transmission antenna 2b is as shown by a broken line of FIG. 2(a). The amplitude of the voltage inputted to the first transmission antenna 2a of the transmission and reception system for power transmission when no foreign object exists is as shown by a solid line of FIG. 2(a).

In contrast, when a foreign object exists in the above-mentioned range, the amplitude of the voltage detected by the transmission power state detecting circuit 11b of the transmission and reception system for foreign object detection is as shown by a broken line of FIG. 2(b). More specifically, the amplitude of the voltage when a foreign object exists decreases under the influence of reflection by the foreign object as compared with the amplitude of the voltage when no foreign object exists. Although in this example a case in which the foreign object is a one which causes the amplitude to decrease is shown, the change direction of the amplitude differs according to the type of the foreign object. Therefore, the presence or absence of a foreign object can be detected by monitoring this change of the amplitude. Although only the amplitude of the voltage which is included in the transmission power state is shown in the example of FIG. 2, the same goes for any other item.

When a foreign object is then detected by the foreign object detecting circuit 124b, the power control circuit 125b outputs a control signal to the first resonant type transmission power supply device 1a according to the information stored in the control pattern memory circuit 123b. The first resonant type transmission power supply device 1a then reduces (lowers the electric power to the small power in the transmission and reception system for foreign object detection or less) or stops the supply of the electric power to the first transmission antenna 2a according to the above-mentioned control signal (refer to the solid line shown in FIG. 2(b)). As a result, the power transmission by the transmission and reception system for power transmission can be controlled to a safe state with respect to the above-mentioned foreign object.

After that, the transmission of the electric power from the transmission and reception system for foreign object detection to the starting circuit 41 of the reception power supply device 4 is stopped depending on the type of the foreign object, and a degree such as the size of the foreign object. Therefore, the starting circuit 41 stops and the whole of the reception power supply device 4 stops.

As mentioned above, because the resonant type power transmission system according to this Embodiment 1 is configured in such a way as to include the transmission and reception system for power transmission and the transmission and reception system for foreign object detection, and monitor a change of the transmission power state of the second transmission antenna 2b, the resonant type power transmission system can detect the presence or absence of a foreign object in the overlapping range of the electromagnetic fields from the first and second transmission antennas 2a and 2b, and, when detecting a foreign object, can reduce or stop the supply of the electric power to the first transmission antenna 2a.

Further, because sensor coils 102 or the likes for foreign object detection, like those disposed in a conventional configuration, are not needed for the foreign object detection, the first transmission and reception antennas 2a and 3a can be configured in a small size and in a lightweight. Further, a foreign object existing, in the electromagnetic field generated from the first transmission antenna 2a, at a long distance away from the first transmission antenna 2a or in the vicinity of the center of the first transmission and reception antennas 2a and 3a can be also detected.

Although the case in which the transmission power state detecting circuit 11b shown in FIG. 1 detects, as the transmission power state, all of the reflection power, the phase difference between the voltage and the current, and the amplitudes of the voltage and the current is shown, this embodiment is not limited to this example. Although the accuracy of detection of a foreign object degrades, some of the detection items can be eliminated.

Further, commonality of the transmission power state detecting circuit 11b shown in FIG. 1 can be achieved as a detecting circuit at the time of adjusting the resonance coupling impedance of the second transmission and reception antennas 2b and 3b according to a change of the input impedance of the second reception antenna 3b, and a cost reduction can be achieved. In this case, a resonance impedance adjusting circuit that adjusts the resonance impedance of the second transmission antenna 2b (matches the resonance condition of the second transmission antenna 2b to that of the second reception antenna 3b) on the basis of the detection result acquired by the transmission power state detecting circuit 11b is disposed separately.

Embodiment 2

Figure 3:
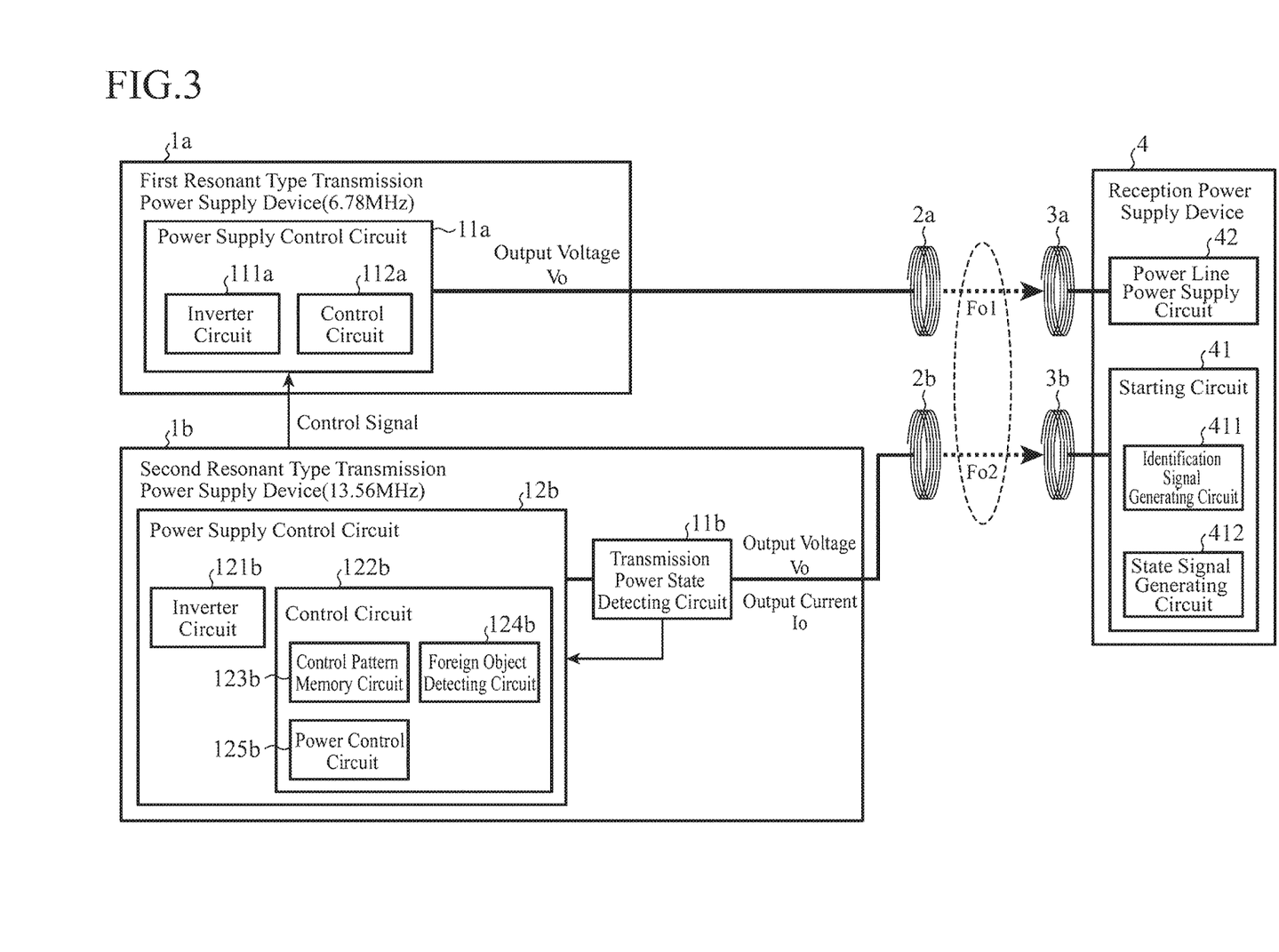
FIG. 3 is a diagram showing the configuration of a resonant type power transmission system according to Embodiment 2 of the present invention.

FIG. 3 is a diagram showing the configuration of a resonant type power transmission system according to Embodiment 2 of the present invention. The resonant type power transmission system according to Embodiment 2 shown in this FIG. 3 additionally includes an identification signal generating circuit 411 and a state signal generating circuit 412 in a starting circuit 41 of a reception power supply device 4. The other components are the same as those according to Embodiment 1 and are designated by the same reference character strings, and an explanation will be made as to only a different portion.

Although in the example shown in FIG. 3, a case in which a transmission and reception system for power transmission performs power transmission by using a 6.78 MHz band as its transmission frequency and a transmission and reception system for foreign object detection performs power transmission by using a 13.56 MHz band as its transmission frequency is shown, this embodiment is limited to this example. The above-mentioned frequency bands are used for commercial power supplies.

The identification signal generating circuit 411 generates a signal (identification signal) showing identification information about the reception power supply device 4, and piggybacks the signal onto the transmission frequency of the transmission and reception system for foreign object detection. At that time, the identification signal generating circuit 411 generates, as the identification signal, a serial signal or the like by using pulse load or the like.

The state signal generating circuit 412 generates a signal (state signal) showing a reception state of the reception power supply device 4, and piggybacks the signal onto the transmission frequency of the transmission and reception system for foreign object detection. As the reception state, for example, an overcharging state or an operation abnormality state of the reception power supply device 4, a power requirement state in which large electric power is required, or the like is provided. Further, the state signal generating circuit 412 generates, as the state signal, a serial signal or the like by using pulse load or the like.

A transmission power state detecting circuit 11*b* has a function of extracting the signal (the identification signal or the state signal) piggybacked by the identification signal generating circuit 411 or the state signal generating circuit 412 from a detection result acquired thereby, in addition to the function according to Embodiment 1.

Further, a power control circuit 125*b* has a function of controlling a first resonant type transmission power supply device 1*a* on the basis of the signal extracted by the transmission power state detecting circuit 11*b*, in addition to the function according to Embodiment 1. When the above-mentioned signal is the identification signal, the power control circuit 125*b* authenticates the reception power supply device 4 on the basis of the identification signal, and, when succeeding in the authentication, controls the first resonant type transmission power supply device 1*a* in such a way as to supply electric power to a first transmission antenna 2*a*. In contrast, when the above-mentioned signal is the state signal, the power control circuit 125*b* controls the first resonant type transmission power supply device 1*a* on the basis of the reception state shown by the state signal.

Figure 4:
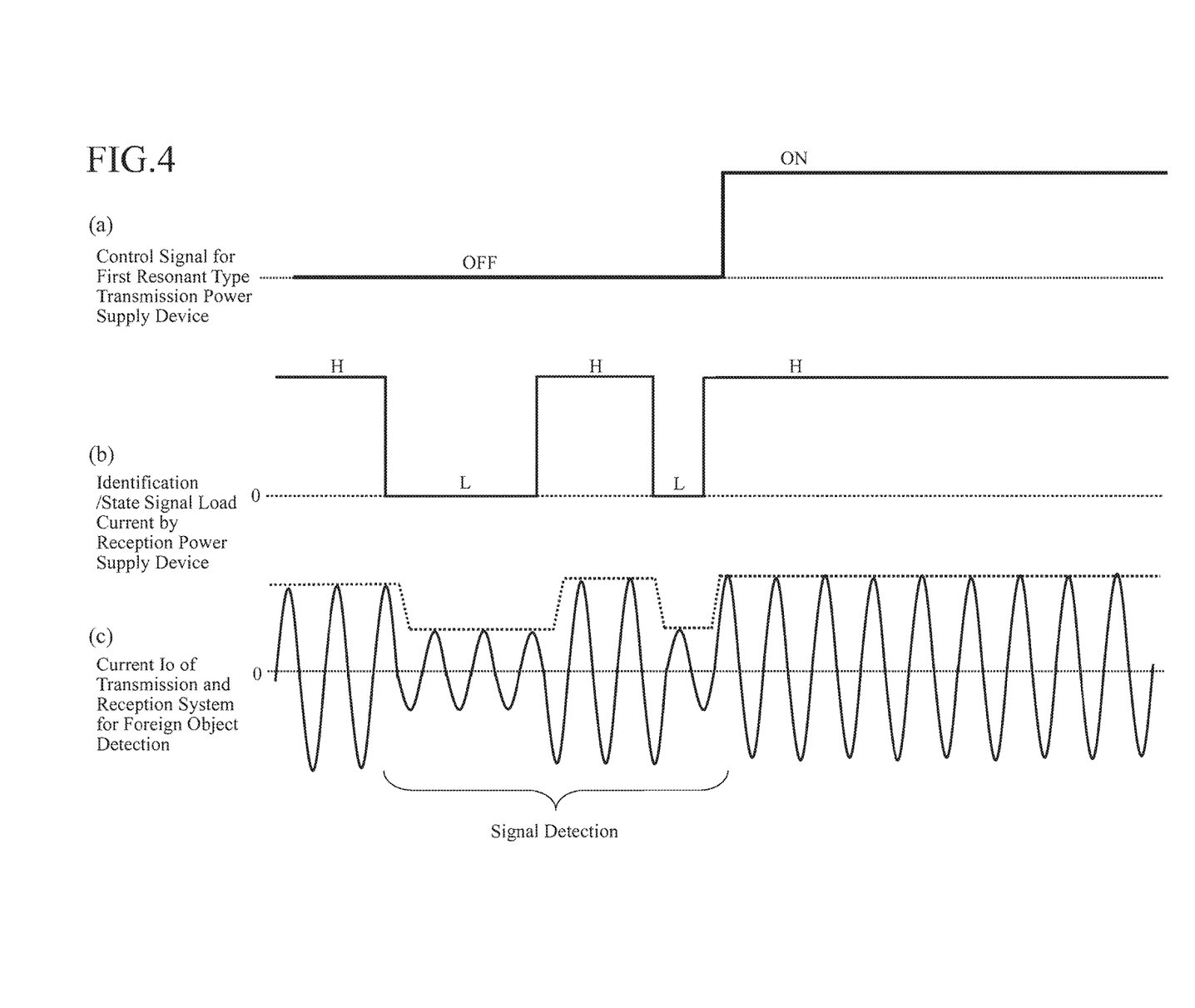
FIG. 4 is a diagram explaining the operation of the resonant type power transmission system according to Embodiment 2 of the present invention.

Next, the operation of the resonant type power transmission system configured as above will be explained by referring to FIG. 4. FIG. 4(*a*) shows the presence or absence of the control signal for the first resonant type transmission power supply device 1*a*, FIG. 4(*b*) shows the identification signal piggybacked from the reception power supply device 4 to the transmission and reception system for foreign object detection, and FIG. 4(*c*) shows the amplitude of a current inputted to a second transmission antenna 2*b* of the transmission and reception system for foreign object detection.

In the resonant type power transmission system, first, the transmission and reception system for foreign object detection performs power transmission with small power equal to or smaller than that according to the human radiation protection guidelines and standards and having a degree that can start a starting circuit 41. More specifically, AC or DC power (small power) is supplied to a power supply control circuit 12*b* of a second resonant type power transmission power supply device 1*b*, and an inverter circuit 121*b* of the power supply control circuit 12*b* supplies an AC output having a high frequency to the second transmission antenna 2*b*. The electric power supplied to the second transmission antenna 2*b* resonates at the AC frequency and is transmitted from the second transmission antenna 2*b* to a second reception antenna 3*b*. AC output of the electric power received by the second reception antenna 3*b* to the reception power supply device 4 is performed, and the starting circuit 41 starts.

Then, the identification signal generating circuit 411 of the starting circuit 41 generates the identification signal about the reception power supply device 4, and piggybacks the identification signal onto the transmission frequency of the transmission and reception system for foreign object detection, as shown in FIG. 4(*b*). The transmission power state detecting circuit 11*b* then extracts the identification signal by using a current ripple or the like, as shown in FIG. 4(*c*). The power control circuit 125*b* then authenticates the reception power supply device 4 on the basis of this identification signal, and, when succeeding in the authentication, controls the first resonant type transmission power supply device 1*a* in such a way as to supply the electric power to the first transmission antenna 2*a* (FIG. 4(*a*)).

After that, a power line power supply circuit 42 starts, and the transmission and reception system for power transmission starts the transmission of main power. More specifically, AC or DC power (main power) is supplied to the power supply control circuit 11*a* of the first resonant type transmission power supply device 1*a*, and the inverter circuit 111*a* of the power supply control circuit 11*a* supplies an AC output having a high frequency to the first transmission antenna 2*a*. The electric power supplied to the first transmission antenna 2*a* resonates at the AC frequency and is transmitted from the first transmission antenna 2*a* to the first reception antenna 3*a*. AC output of the electric power received by the first reception antenna 3*a* to the reception power supply device 4 is performed. The reception power supply device 4 then rectifies the electric power and performs DC or AC output of the electric power.

On the other hand, the transmission and reception system for foreign object detection regularly or intermittently performs the power transmission of the small power and performs the foreign object detection. The foreign object detection operation by this transmission and reception system for foreign object detection is the same as that according to Embodiment 1, and the explanation of the foreign object detection operation will be omitted hereafter.

Further, the state signal generating circuit 412 of the reception power supply device 4 generates the state signal about the reception power supply device 4, and piggybacks the state signal onto the transmission frequency of the transmission and reception system for foreign object detection. The transmission power state detecting circuit 11*b* then extracts the state signal by using a current ripple or the like. The power control circuit 125*b* then controls the first resonant type transmission power supply device 1*a* on the basis of the state signal. At that time, when the state signal shows an overcharging state, an operation abnormality state, or the like, the power control circuit controls the first resonant type transmission power supply device 1*a* in such a way as to stop the supply of the electric power to the first transmission antenna 2*a*. In contrast, when the state signal shows a power supply requirement state or the like, the power control circuit controls the first resonant type transmission power supply device 1*a* in such a way as to maximize the supply of the electric power to the first transmission antenna 2*a*.

As mentioned above, because the resonant type power transmission system according to this Embodiment 2 is configured in such a way as to perform communications between the reception power supply device 4 and the transmission and reception system for foreign object detection, the resonant type power transmission system can perform authentication and state detection on the reception power supply device 4, in addition to the advantages provided by Embodiment 1. Further, because the resonant type power transmission system can authenticate the reception power supply device 4, a billing system for the reception power supply device 4 can be configured by using the present invention.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The resonant type power transmission system according to the present invention can detect the presence or absence of a foreign object in an electromagnetic field generated from a transmission antenna, and, when detecting a foreign object, can perform reduction or stop of the power transmission, and the resonant type power transmission system is suitable for use as a resonant type power transmission system or the like that controls the supply of electric power to a transmission antenna.

EXPLANATIONS OF REFERENCE NUMERALS 1a, 1b first and second resonant type transmission power supply devices, 2a, 2b first and second transmission antennas, 3a, 3b first and second reception antennas, 4 reception power supply device, 11b transmission power state detecting circuit, 11a, 12b power supply control circuit, 41 starting circuit, 42 power line power supply circuit, 111a, 121b inverter circuit, 112a, 122b control circuit, 123b control pattern memory circuit, 124b foreign object detecting circuit, 125b power control circuit, 411 identification signal generating circuit, and 412 state signal generating circuit.

The invention claimed is:

1. A resonant type power transmission system comprising:
a transmission and reception system for power transmission having a first transmission antenna, a first reception antenna, and a first resonant type transmission power supply device configured to control supply of electric power to said first transmission antenna;
a transmission and reception system for foreign object detection having a second transmission antenna whose range of an electromagnetic field generated therefrom overlaps that of an electromagnetic field generated from said first transmission antenna, a second reception antenna, and a second resonant type transmission power supply device configured to supply regular or intermittent small power to said second transmission antenna;
a starting circuit configured to receive the small power from said second reception antenna and start; and
a reception power supply device configured to be started by said starting circuit and receive the electric power from said first reception antenna, wherein
said second resonant type transmission power supply device comprises:
a transmission power state detecting circuit configured to detect a transmission power state of said second transmission antenna;
a foreign object detecting circuit configured to detect presence or absence of a foreign object in said overlapping range of the electromagnetic fields on a basis of a detection result acquired by said transmission power state detecting circuit; and
a power control circuit configured to control said first resonant type transmission power supply device in such a way as to reduce or stop the supply of the electric power to said first transmission antenna when a foreign object is detected by said foreign object detecting circuit, and
said resonant type power transmission system further comprises a resonance impedance adjusting circuit configured to match a resonance condition of said second transmission antenna to that of said second reception antenna on a basis of the detection result acquired by said transmission power state detecting circuit.

2. The resonant type power transmission system according to claim 1, wherein said transmission power state detecting circuit detects, as the transmission power state, at least one of reflection power from said second transmission antenna, a phase difference between a voltage and a current which are inputted to said second transmission antenna, and amplitudes of said voltage and said current.

3. The resonant type power transmission system according to claim 1, comprising a plurality of said transmission and reception systems for foreign object detection.

4. The resonant type power transmission system according to claim 1, wherein a transmission frequency of said transmission and reception system for power transmission and a transmission frequency of said transmission frequency transmission and reception system for foreign object detection are an identical fixed frequency.

5. The resonant type power transmission system according to claim 1, wherein a transmission frequency of said transmission and reception system for power transmission and a transmission frequency of said transmission frequency transmission and reception system for foreign object detection are different fixed frequencies.

6. The resonant type power transmission system according to claim 1, wherein said reception power supply device comprises:
an identification signal generating circuit configured to generate a signal showing identification information about said reception power supply device, and piggyback the signal onto a transmission frequency of said transmission and reception system for foreign object detection; and
a state signal generating circuit configured to generate a signal showing a reception state of said reception power supply device, and piggyback the signal onto the transmission frequency of said transmission and reception system for foreign object detection, wherein
in said second resonant type transmission power supply device, said transmission power state detecting circuit is configured to extract the signal piggybacked by said identification signal generating circuit or said state signal generating circuit from the detection result, and
said power control circuit is configured to control said first resonant type transmission power supply device on a basis of the signal extracted by said transmission power state detecting circuit.

7. The resonant type power transmission system according to claim 1, wherein said second transmission antenna performs wireless power transmission according to magnetic-field resonance with said second reception antenna.

8. The resonant type power transmission system according to claim 1, wherein said second transmission antenna performs wireless power transmission according to electric-field resonance with said second reception antenna.

9. The resonant type power transmission system according to claim 1, wherein said second transmission antenna performs wireless power transmission according to electromagnetic induction with said second reception antenna.

10. A resonance type power transmission device comprising:
- a transmission and reception system for power transmission having a first transmission antenna, a first reception antenna, and a first resonant type transmission power supply device configured to control supply of electric power to said first transmission antenna; and
- a transmission and reception system for foreign object detection having a second transmission antenna whose range of an electromagnetic field generated therefrom overlaps that of an electromagnetic field generated from said first transmission antenna, a second reception antenna, and a second resonant type transmission power supply device configured to supply regular or intermittent small power to said second transmission antenna, wherein said second resonant type transmission power supply device comprises:
- a transmission power state detecting circuit configured to detect a transmission power state of said second transmission antenna;
- a foreign object detecting circuit configured to detect presence or absence of a foreign object in said overlapping range of the electromagnetic fields on a basis of a detection result acquired by said transmission power state detecting circuit; and
- a power control circuit configured to control said first resonant type transmission power supply device in such a way as to reduce or stop the supply of the electric power to said first transmission antenna when a foreign object is detected by said foreign object detecting circuit, and said resonance type power transmission device further comprises a resonance impedance adjusting circuit configured to match a resonance condition of said second transmission antenna to that of said second reception antenna on a basis of the detection result acquired by said transmission power state detecting circuit.

11. The resonant type power transmission system according to claim 1, wherein:
said foreign object detecting circuit determines whether said foreign object is a dielectric object.

12. The resonant type power transmission system according to claim 11, further comprising:
a power control circuit to control said first resonant type transmission power supply device according to whether said foreign object is a dielectric or not in order to reduce or stop the supply of electric power to said first transmission antenna.

13. The resonant type power transmission system according to claim 12, wherein:
said power control circuit stops the supply of the electric power to said first transmission antenna when said foreign object is a dielectric foreign object.

14. The resonant type power transmission system according to claim 10, wherein:
said foreign object detecting circuit determines whether said foreign object is a dielectric object.

15. The resonant type power transmission system according to claim 14, further comprising:
a power control circuit to control said first resonant type transmission power supply device according to whether said foreign object is a dielectric or not in order to reduce or stop the supply of electric power to said first transmission antenna.

16. The resonant type power transmission system according to claim 15, wherein:
said power control circuit stops the supply of the electric power to said first transmission antenna when said foreign object is a dielectric foreign object.

* * * * *